United States Patent [19]

Bantle et al.

[11] Patent Number: 4,690,462
[45] Date of Patent: Sep. 1, 1987

[54] CENTRAL LOCKING ARRANGEMENT

[75] Inventors: Manfred Bantle, Vaihingen; Reinhard Lechner, Pforzheim, both of Fed. Rep. of Germany

[73] Assignee: Dr. Ing. h.c.F. Porsche Aktiengesellschaft, Fed. Rep. of Germany

[21] Appl. No.: 819,342

[22] Filed: Jan. 16, 1986

[30] Foreign Application Priority Data

Jan. 16, 1985 [DE] Fed. Rep. of Germany ....... 3501240

[51] Int. Cl.$^4$ .............................................. B60B 27/00
[52] U.S. Cl. ............................ 301/9 CN; 301/105 R; 301/111
[58] Field of Search .......... 301/37 AT, 37 SC, 9 CN, 301/9 DH, 9 DN, 9 S, 9 SC, 105 R, 109, 110, 111, 124 R, 124 H, 126, 131, 132

[56] References Cited

U.S. PATENT DOCUMENTS

| | | | |
|---|---|---|---|
| 2,109,684 | 3/1938 | Short | 301/37 AT |
| 3,361,177 | 1/1968 | Fawick | 301/9 DN X |
| 3,649,079 | 3/1972 | English | 301/9 DN |
| 3,833,266 | 9/1974 | Lamme | 301/37 AT |
| 4,299,425 | 11/1981 | Renz et al. | 301/9 CN |
| 4,354,711 | 10/1982 | Wain | 301/9 CN |
| 4,478,458 | 10/1984 | Flexman | 301/9 DN X |
| 4,591,211 | 5/1986 | Browning et al. | 301/9 CN X |

FOREIGN PATENT DOCUMENTS

2301920 1/1973 Fed. Rep. of Germany .
2818512 4/1978 Fed. Rep. of Germany .

Primary Examiner—Robert B. Reeves
Assistant Examiner—Russell D. Stormer

[57] ABSTRACT

A central locking arrangement for wheels of motor vehicles with a centrally aranged threaded bush which is connected with a joint shaft, whereby the bush retainingly receives the wheel under interposition of a wheel hub. An anti-rotation protecting sleeve which is arranged inside of the threaded bush is connected with the joint shaft and the bush. The anti-rotation protecting sleeve is form-lockingly connected with its free end opposite the joint shaft with a lockable anti-threft protecting lock adapted to be inserted in the bush. The threaded bush includes a longitudinal bore with a polygonally shaped section that serves for the work-tool engagement and in which the protecting sleeve is retained by way of a corresponding outer contour.

15 Claims, 2 Drawing Figures

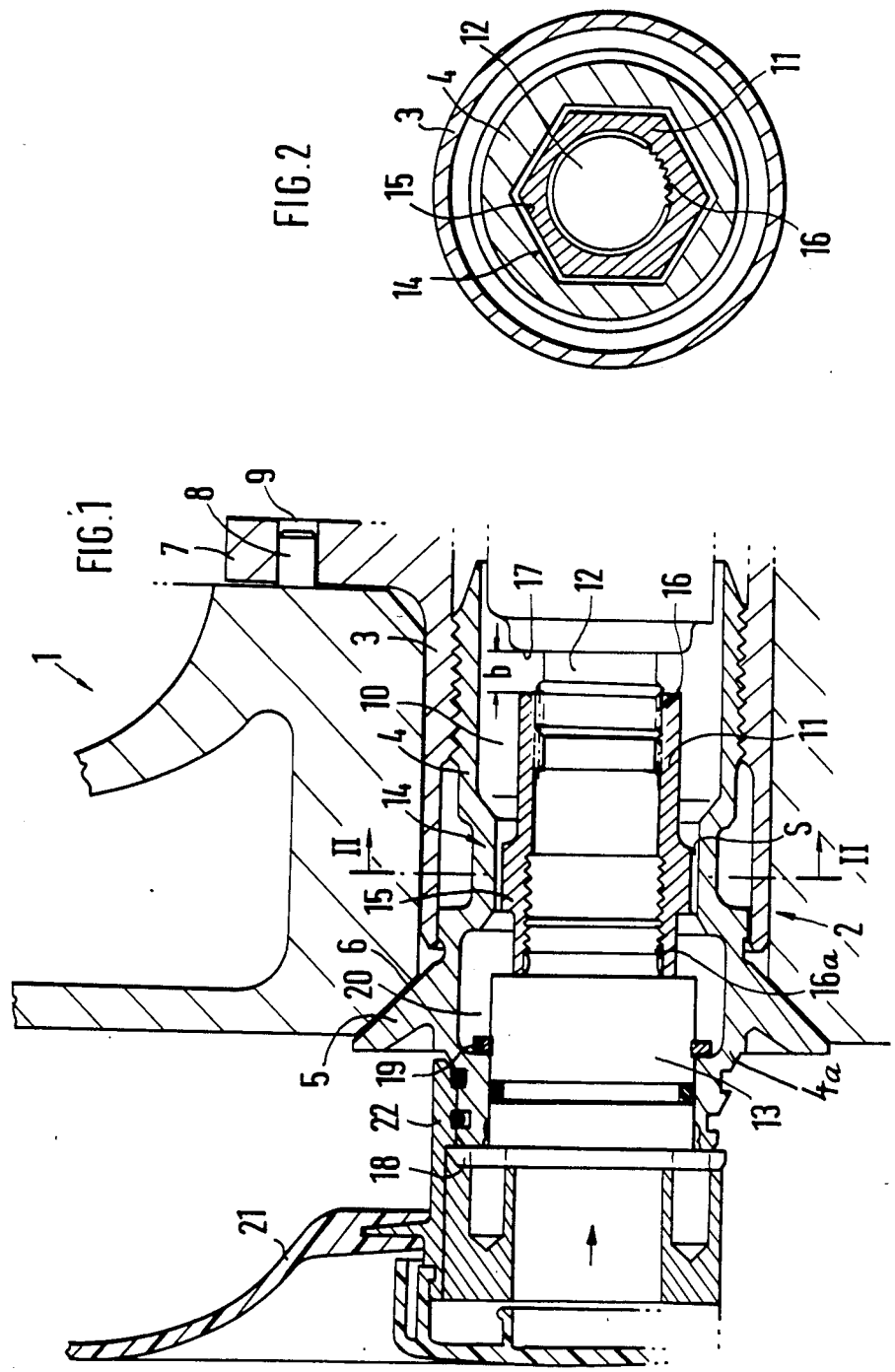

CENTRAL LOCKING ARRANGEMENT

The present invention relates to a central lock arrangement for wheels of motor vehicles with a central arranged threaded bush connected with a drive or joint shaft and retainingly receiving the wheel under interposition of a wheel hub.

Central locking arrangements for wheels of motor vehicles are described in the DE-AS No. 28 18 512. These prior art central locking arrangements include a threaded bush centrally arranged in the wheel and having a radial collar. They are adapted to be screwed on an axle body and clamp in a hub bushing of the wheel arranged between the collar and the wheel carrier flange. For securing the wheel against becoming loosened or detached from the hub by rotation, a cotter pin or the like is provided which, however, cannot satisfactorily fulfill the requirements for an effective theft protection. For purposes of theft protection of motor vehicle wheels, a costly threaded fastening is used (DE-OS No. 23 01 920) which includes a lock inserted into the head of the wheel bolt, by way of which a sleeve is secured which covers the external hexagon of the bolt and is intended to secure the same against access by unauthorized persons.

It is the object of the present invention to provide a central locking arrangement for motor vehicle wheels by means of which a wheel anti-theft protection is realizable with good effectiveness and with the use of simple means.

The underlying problems are solved according to the present invention in that an anti-rotational protecting sleeve protecting against rotation, which is secured with the joint shaft and is retained in the threaded bush, is arranged inside of the bush, whereby the anti-rotation protecting sleeve is form-lockingly connected with its free end opposite the joint shaft with a lockable safety lock adapted to be inserted into the bush.

The advantages principally achieved with the present invention consist in that at the same time a protection of the threaded bush against a detachment due to rotation and a fastening of the safety lock are achieved by way of a single structural element, namely, by way of the anti-rotation protecting sleeve. Furthermore, it is achieved that the sleeve is adapted to be detachably connected with the lock and thus can be more easily handled for the insertion into the threaded bush on the joint shaft. In order that the anti-rotation protecting sleeve can be inserted into the threaded bush independently of the position of the teeth at the joint shaft, the sleeve is retained in the polygonal section of the bush with play. This play corresponds approximately to the width of the tooth gaps of the joint shaft teeth.

In order that the protecting sleeve does not come out of its protective engagement in the polygonal section of the threaded bush when the lock, locked in the threaded bush by way of the tumbler elements, is forcibly twisted off the protecting sleeve, the distance between the sleeve and the joint shaft is so selected that an engagement is assured at all times.

The lock is preferably arranged in an aperture of circular cross-sectional shape within the head of the bush and sealingly closes off the threaded bush at the end face thereof by way of a terminal collar.

For fixing a wheel cover or the like, a retaining element in the form of a sleeve is adapted to be clamped in between the terminal collar of the lock and the threaded bush, on which the wheel cover is adapted to be clipped on at the endside or secured in any other manner.

These and other objects, features and advantages of the present invention will become more apparent from the following description when taken in connection with the accompanying drawing which shows, for purposes of illustration only, one embodiment in accordance with the present invention, and wherein:

FIG. 1 is a partial longitudinal cross-sectional view through a threaded bush with a protecting sleeve, with a lock and with a joint shaft in accordance with the present invention; and FIG. 2 is a cross-sectional view taken along line II—II of FIG. 1.

Referring now to the drawing wherein like reference numerals are used throughout the two views to designate like parts, a wheel generally designated by reference numeral 1 of a motor vehicle is illustrated in FIG. 1. It is secured on a wheel hub 3 by means of a central locking arrangement generally designated by reference numeral 2. The locking arrangement 2 includes essentially a threaded bush 4 which is adapted to be screwed into the wheel hub 3 with a work tool. For fastening the wheel 1 on the wheel hub 3, the threaded bush 4 includes a radial collar 5 with a conical ring zone 6. The wheel 1 is clamped in between this ring zone 6 and a radial collar 7 of the wheel hub 3. Several bolts 8 distributed over the circumference are provided for anti-rotation protection which engage in bores 9 of the radial collar 7.

The threaded bush 4 includes a longitudinal bore 10 in which an anti-rotation protecting sleeve 11 is arranged. This sleeve 11 is connected circumferentially with the bush 4 and is retained on a joint or drive shaft 12 on its wheel inner end. The wheel outer end of the sleeve 11, which is opposite the wheel inner end, is connected with an anti-theft lock 13 for the theft protection of the wheel 1.

The threaded bush 4 includes an approximately center section 14 in the bore 10 with a polygonally shaped configuration. For the form-locking connection of the inwardly disposed protecting sleeve 11, the latter also has a polygonally shaped outer contour 15 corresponding to the bush 4. The connection of the sleeve 11 with the joint shaft 12 takes place by way of a longitudinal splines or teeth 16.

The form-locking connection of the sleeve 11 with the threaded bush 4 prevents rotation of bush 4 by an unauthorized person. This connection between the joint shaft and the wheel is in addition to the other connections, not the subject of this application, including a toothing on the wheel carrier engaging the joint shaft (not shown) and a joggle joint between the wheel carrier and the body of the wheel hub (not shown).

During the insertion of the protecting sleeve 11 into the threaded bush 4, the sleeve 11 may be connected with the lock 13 which is secured in the sleeve 11 by way of a thread 16a. However, it would also be possible to construct the lock 13 in one piece with the sleeve 11.

For purposes of assembly, the anti-rotation protecting sleeve 11 is inserted into the bore 10 of the threaded bush 4 whereby it is retained in the polygonal section 14 of the sleeve 11 with a rotational play S, as also shown more fully in FIG. 2. This rotational clearance S is so large that a mounting over the longitudinal splined connection 16 of the joint shaft 12 is not prevented, for example, when the individual teeth of the two toothed connection face one another, i.e. are disposed opposite one another. Thus, for example, the hexagon of the protecting sleeve 11 has a key width of 28.8 mm. and the hexagon of the section 14 of the threaded bush 4 a key width of 30 mm.

The anti-rotation protecting sleeve 11 is arranged at an axial distance b (FIG. 1) with respect to the joint shaft 12. This distance b is selected so large that during an abutment at the shank 17 of the joint shaft 12, the sleeve 11 is nonetheless still in form-locking engagement with the bush 4. An axial adjustment of the protecting sleeve 11 is possible when an unauthorized person seeks to remove the lock 13 and rotates the same in such a manner that the sleeve 11 twists off the lock 13 by way of the thread 16a.

By fixing the protecting sleeve 11 at the joint shaft 12 by way of the teeth 16 and owing to the further form-locking connection by means of the polygonal construction of sleeve 11 and bush 4, a loosening or detaching of the threaded bush 4 by rotation and therewith a loosening or detachment of the wheel 1 is prevented.

The lock 13 which is arranged in the forward area (free end 4a) of the threaded bush 4, closes off the bush 4 at its end-face by means of a collar 18. The bore 10 of the bush 4 is constructed circularly shaped in cross section so that the lock 13 is rotatable in the position secured by the tumbler elements 19. The tumbler elements 19 engage in an undercut 20 of the threaded bush 4 so that an axial removal is prevented. A key which serves for the actuation of the lock from the outside, is not illustrated and is inserted into the lock in the direction of the arrow (FIG. 1).

For fastening a wheel cover 21 or the like, a retaining element 22 is clamped in between the terminal collar 18 of the lock 13 and the radial collar 5 of the threaded bush 4, whereby a wheel cover, hub cap or the like is adapted to be mounted on the retaining element 22 by any suitable means, such as a clip-on connection.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A central locking arrangement for wheels of motor vehicles, comprising:
   a centrally arranged threaded bush means operable to be connected with a joint shaft, said threaded bush means retainingly receiving a wheel under interposition of a wheel hub means,
   an anti-rotation protecting sleeve means having an inner and outer end, arranged inside of the threaded bush means, said protecting sleeve means being engageable at its inner end with the joint shaft and retained in the bush means in a form-locking manner, said sleeve means being axially slideable within the bush means and axially movable with respect to the joint shaft while maintaining a form-locking arrangement with the bush means, and
   a safety lock means adapted to be inserted and locked in the bush means, said sleeve means being form-lockingly connected at its outer end with the safety lock means.

2. A central locking arrangement according to claim 1, wherein the threaded bush means is provided with a longitudinal bore having a polygonally shaped section in which the sleeve means is retained by way of a corresponding polygonally shaped outer contour thereof.

3. A central locking arrangement according to claim 2, wherein the sleeve means is adapted to be axially slid in the bush means over longitudinal teeth of the joint shaft, the sleeve means being retained in the polygonally shaped section of the bush means with a rotational play by way of the polygonally shaped outer contour of the sleeve means.

4. A central locking arrangement according to claim 3, wherein the sleeve means has such an axial displacement clearance with respect to the joint shaft that the polygonally shaped outer contour of the sleeve means remains in form-locking engagement with the polygonally shaped inner contour of the threaded bush means.

5. A central locking arrangement according to claim 4, wherein the rotational play has such a magnitude that the safety lock means via the sleeve means, is adapted to be mounted over the longitudinal teeth of the joint shaft independent of the circumferential position of the threaded bush means.

6. A central locking arrangement according to claim 5, wherein the sleeve means is constructed in one piece with the lock means.

7. A central locking arrangement according to claim 5, wherein the safety lock means has a circular cross-sectional shape and includes tumbler elements, and wherein the longitudinal bore of the threaded bush means has a circular cross-sectional shape within the area of the safety lock means corresponding to the shape of the safety lock means and is provided with an undercut operable to be engaged by tumbler elements of the safety lock means.

8. A central locking arrangement according to claim 7, said threaded bush means having an inner and outer face and a radial collar for retainingly receiving the wheel, wherein the safety lock means includes a terminal collar which sealingly abuts at the outer face of the threaded bush means, and wherein a retaining element for retaining a wheel cover and/or a hub cap to the threaded bush means is provided between the terminal collar and the radial collar of the threaded bush means.

9. A central locking arrangement according to claim 2, wherein the sleeve means has such an axial displacement clearance with respect to the joint shaft that the polygonally shaped outer contour of the sleeve means remains in form-locking engagement with the polygonally shaped inner contour of the threaded bush means.

10. A central locking arrangement according to claim 3, wherein the rotational play has such a magnitude that the safety lock means via the sleeve means is adapted to be mounted over the longitudinal teeth of the joint shaft independent of the circumferential position of the threaded bush means.

11. A central locking arrangement according to claim 1, wherein the sleeve means is constructed in one piece with the lock means.

12. A central locking arrangement according to claim 2, wherein the safety lock means has a circular cross-sectional shape and includes tumbler elements, and wherein the longitudinal bore of the threaded bush means has a circular cross-sectional shape within the area of the safety lock means corresponding to the shape of the safety lock means and is provided with an undercut operable to be engaged by tumbler elements of the safety lock means.

13. A central locking arrangement according to claim 1, said threaded bush means having an inner and outer face a radial collar for retainingly receiving the wheel, wherein the safety lock means includes a terminal collar which sealingly abuts at the outer face of the threaded bush means, and wherein a retaining element for retaining a wheel cover and/or a hub cap to the threaded bush means is provided between the terminal collar and the radial collar of the threaded bush means.

14. A central locking arrangement according to claim 13, wherein the safety lock means has a circular cross-sectional shape and includes tumbler elements, and wherein the longitudinal bore of the threaded bush means has a circular cross-sectional shape within the area of the safety lock means corresponding to the shape of the safety lock means and is provided with an undercut operable to be engaged by tumbler elements of the safety lock means.

15. A central locking arrangement according to claim 2, wherein the polygonally shaped section of the bush means receives a work tool for fixing the bush means to the wheel hub means.

* * * * *